UNITED STATES PATENT OFFICE.

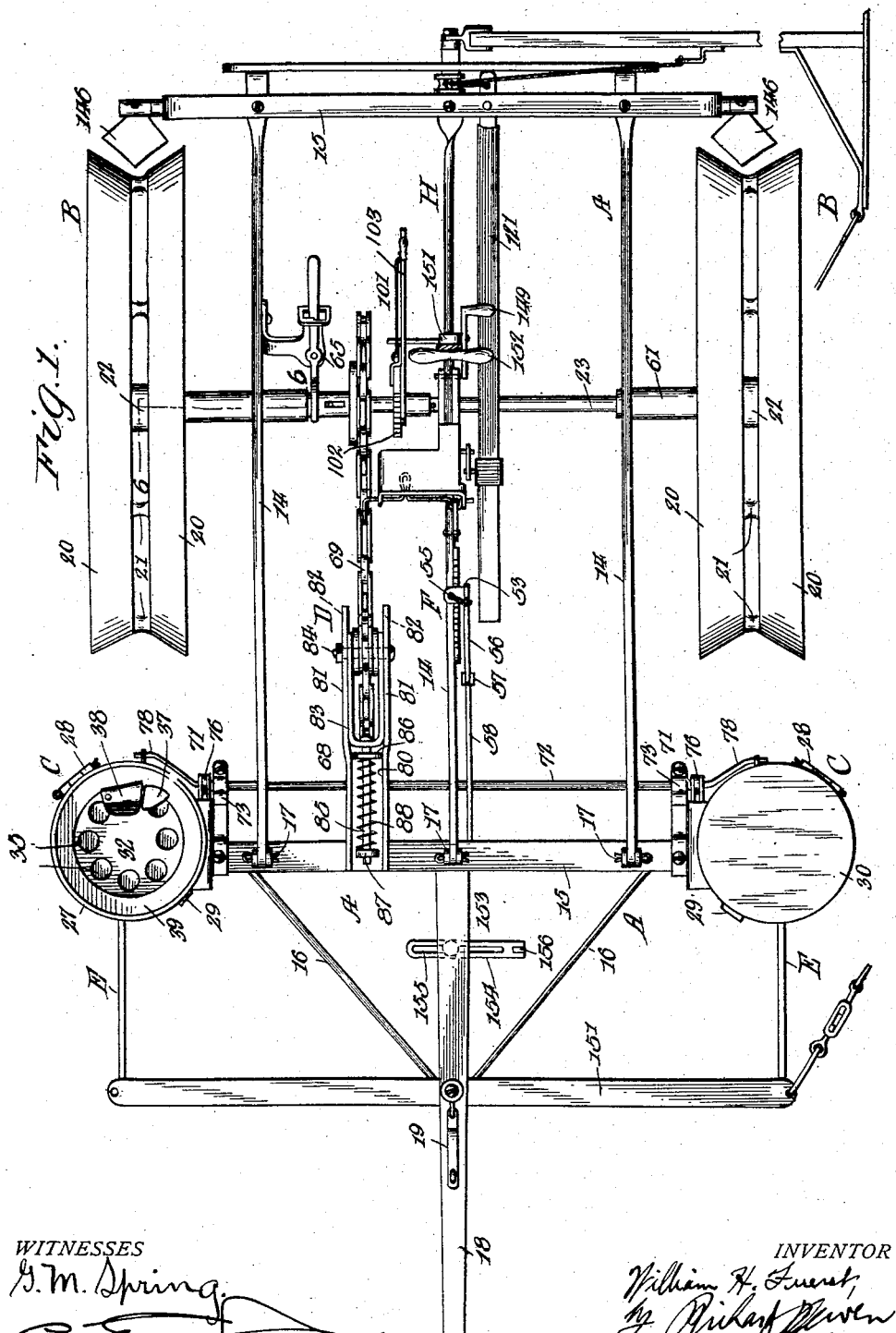

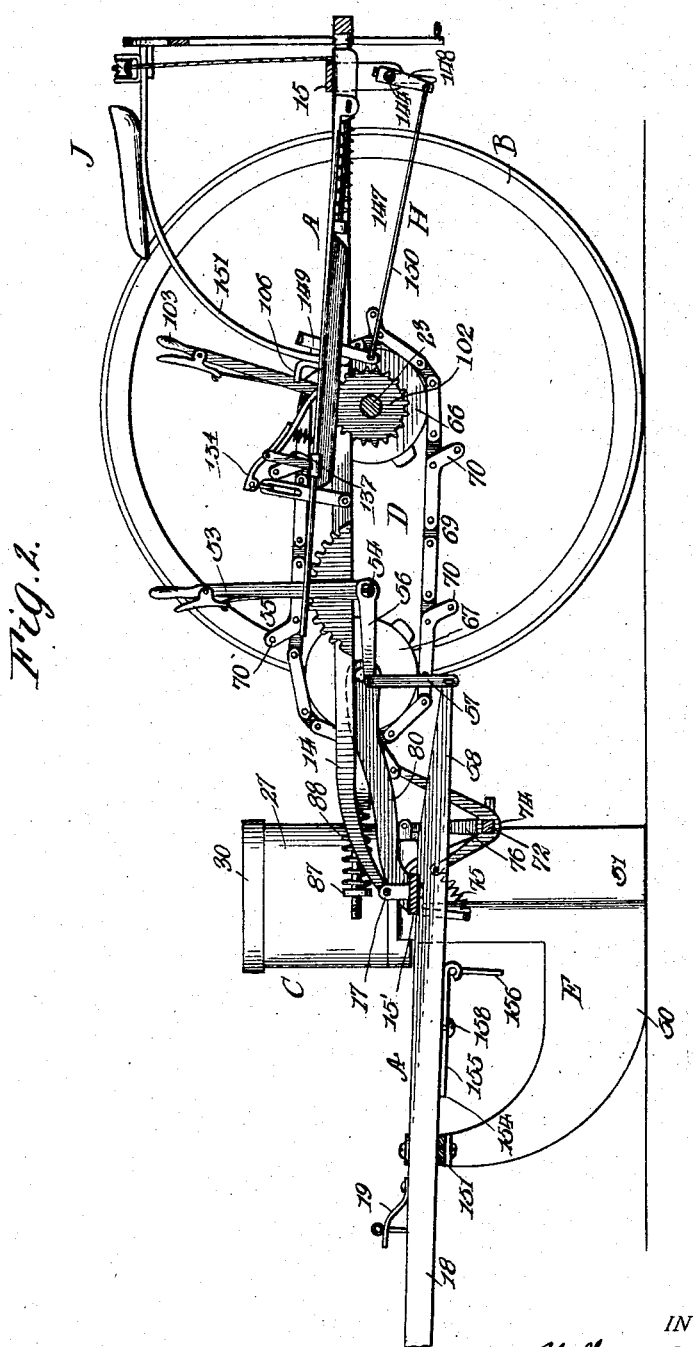

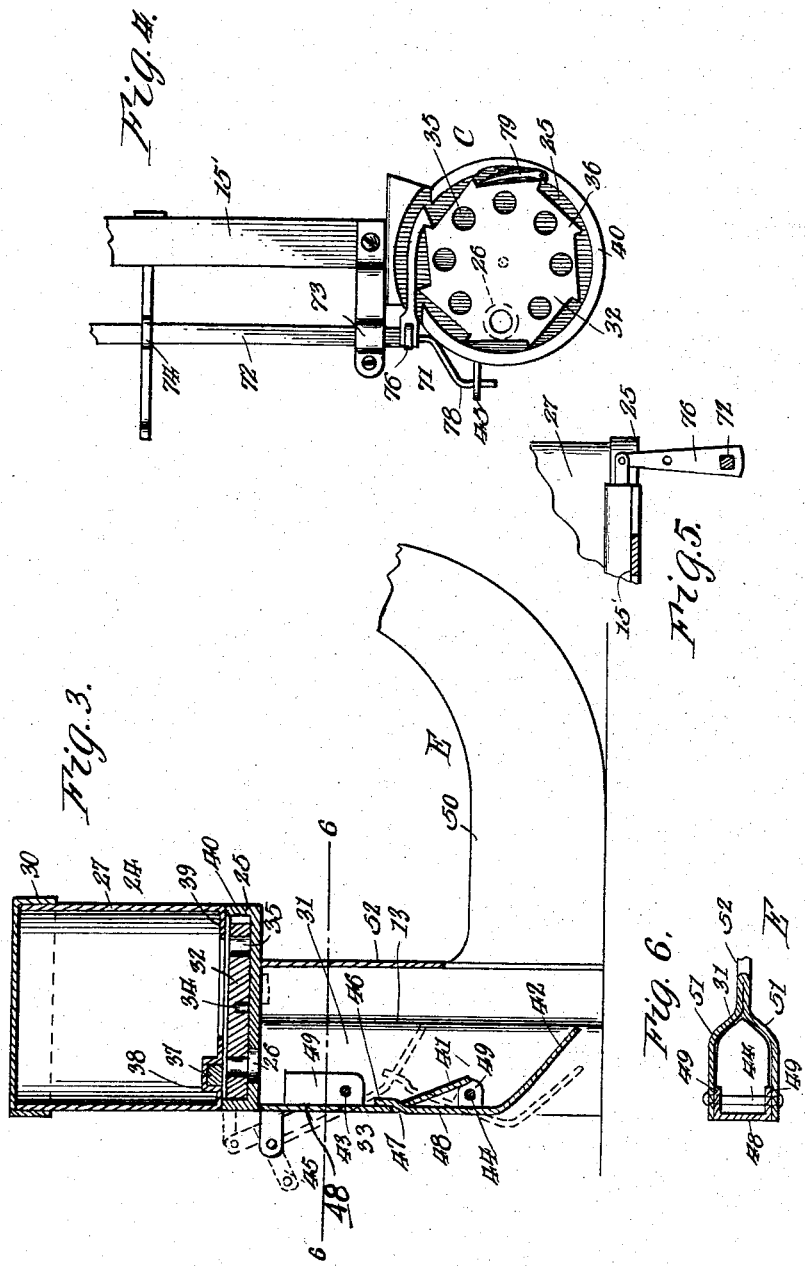

WILLIAM H. FUERST, OF KEWANEE, ILLINOIS.

PLANTER.

1,186,390. Specification of Letters Patent. Patented June 6, 1916.

Application filed January 11, 1913. Serial No. 741,530.

*To all whom it may concern:*

Be it known that I, WILLIAM H. FUERST, a citizen of the United States, residing at Kewanee, in the county of Henry and State of Illinois, have invented new and useful Improvements in Planters, of which the following is a specification.

My present invention relates to planters of the class adapted to be drawn over the soil by the inclusion of ground wheels the dispensing means being operable from the said wheels.

The principal objects of my invention are to provide a simple and efficient planter which may be successfully operated by one man; to provide an improved dispensing means, proper, for the granular materials; to provide an improved transmission whereby the dispensing means may be operated from the ground wheels of the machine; and to provide an improved means for adjusting the furrow opener.

Other objects of my invention will appear in the following detailed description, taken in connection with the accompanying drawings; forming a part of this specification, and in which drawings:

Figure 1 is a plan view of a planter constructed according to my invention, parts being broken away and removed to condense the view. Fig. 2 is a longitudinal sectional view through the planter disclosed in Fig. 1. Fig. 3 is a central vertical sectional view through the dispensing means for the granular material, and showing a furrow opening share in operative relation thereto. Fig. 4 is a plan view of a portion of the mechanism disclosed in Fig. 3, together with means for operating the dispensing means. Fig. 5 is a fragmentary elevation, with parts in section, disclosing a portion of the dispensing means and actuating members therefor. Fig. 6 is a cross sectional view on the line 6—6 of Fig. 3.

In the drawings, where similar characters refer to similar parts, A designates a main frame supporting the mechanical movements, and including a forward frame portion A' having a transverse horizontal axis of oscillation. The frame A may be constructed of longitudinally extending members 14, and a transversely extending frame member 15, the forward portion A' being suitably constructed of transversely extending frame members 15', joined by the furrow opening means E, and suitably braced by rods 16. One of the frame members 15' is pivoted to the members 14, as at 17, permitting the frame portion A' to oscillate about a transverse horizontal axis. I also provide, rigid with frame portion A', a tongue 18, having the usual clevis 19, whereby a team of draft animals may be hitched to the machine.

The character B designates ground wheels upon which frame A travels, and from which motion is transmitted to the dispensing means and other mechanisms to be subsequently described. These wheels are preferably formed of two annular tread portions 20, spaced apart from each other by spokes 21, the tread proper of these annular portions 20 converging inwardly toward each other, to provide a dished periphery for the wheel. The spokes 21 extend from a hub 22 freely movable on a revoluble shaft 23 carried transversely of frame A.

In advance of each wheel B, and preferably carried by frame portion A', I provide dispensing means C for granular material. This dispensing means comprises a receptacle 24 for the granular material, preferably constructed of a base portion 25, having an opening 26 from which the grains may drop by gravity, and a wall portion 27 which may be pivoted to base 25 as at 28 and held in place by a clasp 29; a cover 30 for receptacle 24; means providing a way 31 to which the opening 26 communicates; and, means 32 within the receptacle 24 for controlling passage of grains therefrom. The dispensing means may also include control mechanism 33 in way 31 whereby movement of material therein is controlled. Means 32 may consist of a disk pivoted as at 34 and resting upon base 25, said disk having a plurality of apertures 35 disposed equidistant from the pivot point 34 and adapted to communicate with opening 26 in said base. The disk may also be provided with ratchet teeth 36 for a purpose to be subsequently described. It is also desirable to provide a spring actuated shutter 37 superjacent and in close proximity to the opening 26, but over the disk of means 32, this shutter being carried by a bracket 38 supported by the wall portion 27 of receptacle 24. It is to be noted that this wall portion 27 carries an annular flange 39 disposed over the ratchet teeth of the disk, so that none of the grains find their way in proximity to such ratchet teeth, the disk being accommodated in a recess formed by an upstanding annular flange 40 carried by base 25.

The control mechanism 33 includes two arms 41 and 42, pivoted as at 43 and 44, respectively, the arm 41 being oscillated through an outstanding lug 45. The arms 41 and 42 are connected to move in unison, as by the latter having a tongue 46 extending into an aperture 47 in arm 41. It is to be noted that the upper portions, 48 of these arms form one wall of the way 31, and the pivot means 43 is made possible by oppositely disposed lugs 49 carried by the arm portions 48. The arms 41 and 42 are so disposed that one or the other obstructs passage of grain through way 31. That is, by oscillating arm 41 to the position indicated by dotted lines in Fig. 3, it obstructs passage of grain through the way 31, however, the arm 42 is actuated to permit free passage of grain through said way, below arm 41. When the arm 41 is returned to a normal position, as disclosed in full lines, in Fig. 3, then arm 42 is disposed to obstruct passage of grain in the way.

As before stated, the character E designates a furrow-opener, one of which is provided for each dispensing means C in advance thereof. Each opener E comprises a share 50 in advance of rearwardly diverging mold-boards 51. As clearly shown in Figs. 3 and 6, these mold-boards may form a part of a standard 52, supporting the receptacle 24, and providing the way 31, whereby grains are delivered to the furrow made by opener E.

The character F designates generally, mechanism for controlling the furrow-openers E. This mechanism comprises a lever 53 pivoted to frame A as at 54; mechanism 55, of the well known pawl and ratchet type, for retaining lever 53 rigid with frame A; an arm 56 oscillated by to and fro movement of the lever 53; and a link 57 operatively connecting arm 56 with frame portion A', as through extension 58 of tongue 18. Thus, by drawing lever 53 rearwardly, the frame portion A' is tilted so that the mold-boards 51 are raised above the tread of share 50, so that the section of the furrow made by opener E may be varied. Furthermore, by throwing lever 53 forwardly, tread portion of share 50 is raised above the effective portions of mold-boards 51. It will thus be seen, that, by manipulation of lever 53, the opener E may be adapted for successful use, according to the particular grain planted by the machine.

As disclosed, the dispensing means C is adapted to be operated from ground wheels B, through transmission mechanism designated generally by D. With this end in view, each hub 22 of wheels B carries a clutch member, for coaction with which is a clutch member carried by the axle so that the wheels may turn the axle. Adapted to rotate with axle 23, as through clutch mechanism designated generally by 65, is a wheel 66, preferably a sprocket wheel, while in substantially the same plane as wheel 66 is a second wheel 67 yieldably carried by frame portion A', as through carrier 68. The wheels 66 and 67 have trained over their peripheries an endless carrier 69, preferably a sprocket chain. Movable with carrier 69 are projections 70 which, when the carrier is in the form of a sprocket chain may consist in projections formed integral with the side plates of the chain. These projections are adapted to actuate motion transmitting means designated generally by 71 whereby the dispensing means C is operated.

The motion transmitting means 71 may be constructed of a shaft 72, pivotally carried by frame portion A', as through bearings 73; a double-armed lever 74 rigid with shaft 72, one arm being disposed in the path of movement of projections 70, while the other arm has operatively connected therewith a coil spring 75 which yieldably retains the first-mentioned arm in operative relation to said projections; an arm 76, one for each means C, movable with shaft 72; a pawl pivotally carried by each arm 76 and adapted to engage with the ratchet teeth 36 on the disk of said dispensing means; and, a crank 78 movable with arm 76, and operatively connected with the hereinbefore mentioned lug 45 of mechanism 33. It is also desirable to provide in receptacle 24 a spring actuated detent 79 preventing movement of disk 32 in a direction counter to that provided for by pawl 77. The dispensing means C is therefore operated successively, from wheels B, through clutch mechanism 65, wheel 66, carrier 69, wheel 67, and through the projections 70 to shaft 72 through one of the arms of lever 74, arm 76 and pawl 77 engaging in the ratchet teeth 36. The control mechanism 33 is actuated synchronously with means 32, both being actuated intermittently according to the engagement of projections 70 with the one arm of lever 74.

The wheel 67 is yieldable with respect to frame portion A' through carrier 68 in order that the transmission D may be operative, regardless of actuation of mechanism F. Likewise, the carrier tensions endless carrier 69 to the desired degree. The carrier 68 may comprise a body portion 80 including two parallel journals 81 having elongated bearing slots 82; a forked member 83, the tangs of which receive a spindle 84 carrying wheel 67, said spindle being guided in the bearing slots 82 and the stem 85 of the fork projecting through an abutment 86 carried by body portion 80; an adjustable abutment 87 on stem 85; and, a coil spring 88 interposed between abutments 86 and 87. Thus, the spring 88 draws fork 83 so as to tension carrier 69, however, it permits the frame portion A' to be oscillated but retains the carrier 69 so that its projections 70 are in operative relation to the motion transmitting means 71.

The clutch mechanism 65 is especially desirable inasmuch as I prefer to embody, in the machine, means designated generally by 101, for manually actuating carrier 69 independently of wheels B. This means may include a ratchet wheel 102 movable with wheel 66; and a latch lever 103 oscillatable about axle 23. When not in use the lever 103 rests against an abutment 106 supported from frame A. Thus, with the clutch mechanism 65 is operated so that movement is not imparted to wheel 66 through axle 23, the lever 103 may be thrown forwardly, thereby advancing carrier 69 so that one of its projections 70 is disposed closely adjacent to or in contact with the arm 74, this being desirable so that the planting of grains is provided for as soon as the machine is put into operation.

Referring now to the means for removing soil cake from the wheels B, this means is designated generally by H, and includes a transverse shaft 144, suitably carried by depending portions 145 of frame member 15;
elements 146 oscillatable with shaft 144, one element for each wheel B, formed complementary to the periphery thereof and alined with respect to the plane of the wheel so that it may be oscillated to lie in such proximity to the periphery of the wheel so as to remove soil cake therefrom; and, linkage 147 adapted to oscillate shaft 144. The linkage 147 may consist in an arm 148 rigid with shaft 146; a foot lever 149 pivotally carried by frame member 14; and, a link 150 between lever 149 and arm 148. Thus, by swinging lever 149 rearwardly, the arm 147 is drawn forwardly moving shaft 144 so that the elements 146 are brought into operative relation to the wheels B for the purpose set forth.

The operator's seat J may be carried by resilient member 151, having its ends suitably supported by the central frame member 14 and guide 107 and a foot-rest 152 may be provided for the operator. Of the several mechanisms, the levers 97, 103 and 149, may be disposed in such proximity to seat J that they may be readily manipulated by the operator from such seat.

As disclosed in the drawings, I provide an adjustable guide 153, carried by frame A, which enables the operator from the seat J to follow the line in the soil, previously made by a marker. This guide may consist of a bar 154, having an elongated slot 155; a member 156 depending from said bar; and, a set screw 158 adapted to retain the bar rigid with the frame. The guide 157 is preferably carried by the tongue 18 and may be moved to extend, to various degrees, at either side of the tongue. By this guide, the operator is enabled to dispense grain in rows, spaced apart from each other as desired.

The operation of the planter is as follows:—By manipulation of the lever 53, the furrow-openers E may be adjusted according to the compactness of the soil, and the particular grains which are to be deposited in the furrows. At the start, the operator manipulates lever 101, with clutch mechanism 65 thrown out to position one of the projections 70 of carrier 69 that the means 71 will be operated as soon as the machine is drawn over the soil. The clutch mechanism 65 is then operated so that the transmission D is actuated from wheels B as previously described. Should soil cake cling to the peripheries of wheels B, means H may be operated to remove the same, as previously described.

Changes in details may be made without departing from the spirit or scope of my invention; but,

I claim:—

An agricultural implement including a frame, receptacles, feeding means in said receptacles, digging means including extensions forming conduits supporting said receptacles, upper and lower baffle plates pivotally mounted in each of said conduits, each of said baffle plates including an inwardly extending tongue and the lower baffle plate being provided with a finger extending through an opening formed in the baffle plate being provided with a finger extending from said upper baffle plate, an arm extending from said rocker shaft and engaging said finger, means extending from said rocker shaft for engaging the feeding means of said receptacles, and means for moving said rocker shaft.

WILLIAM H. FUERST.

Witnesses:
 AUGUST PETERSON,
 J. EMMONS FISCHER.